US012519558B2

(12) United States Patent
Pedersen et al.

(10) Patent No.: US 12,519,558 B2
(45) Date of Patent: Jan. 6, 2026

(54) LINK ADAPTATION WITHIN TRANSPORT BLOCKS

(71) Applicant: Nokia Technologies Oy, Espoo (FI)

(72) Inventors: Klaus Ingemann Pedersen, Aalborg (DK); Abolfazl Amiri, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 435 days.

(21) Appl. No.: 17/872,128

(22) Filed: Jul. 25, 2022

(65) Prior Publication Data

US 2024/0031053 A1  Jan. 25, 2024

(51) Int. Cl.
*H04L 1/00* (2006.01)

(52) U.S. Cl.
CPC ............ *H04L 1/0003* (2013.01); *H04L 1/001* (2013.01); *H04L 1/0061* (2013.01)

(58) Field of Classification Search
CPC ..... H04L 1/0003; H04L 1/001; H04L 1/0061; H04L 1/0011; H04L 1/0075; H04L 1/0005
USPC ........................................................ 370/329
See application file for complete search history.

(56) References Cited

U.S. PATENT DOCUMENTS

| 12,040,892 | B2 * | 7/2024 | Abotabl | ................ | H04L 1/0003 |
| 2020/0367094 | A1 * | 11/2020 | Eriksson | ............... | H04W 40/02 |
| 2021/0058219 | A1 | 2/2021 | Kimura et al. | ..................... | 5/14 |
| 2023/0354320 | A1 * | 11/2023 | Papasakellariou | .......................... | |
| | | | | | H04W 72/1268 |
| 2025/0184046 | A1 * | 6/2025 | Stoica | ................... | H04L 1/0057 |

FOREIGN PATENT DOCUMENTS

| EP | 3 499 756 A1 | 6/2019 |
| WO | WO 2021/222770 A1 | 11/2021 |

OTHER PUBLICATIONS

3GPP TS 38.300 V15.3.1, "3rd Generation Partnership Project; Technical Specification Group Radio Access Network; NR; NR and NG-RAN Overall Description; Stage 2 (Release 15)", Oct. 2018, 92 pages.
3GPP TS 38.212 V17.2.0, "3rd Generation Partnership Project; Technical Specification Group Radio Access Network; NR; Multiplexing and channel coding (Release 17)", Jun. 2022, 2101 pages.
3GPP TS 38.214 V16.6.0, "3rd Generation Partnership Project; Technical Specification Group Radio Access Network; NR; Physical layer procedures for data (Release 16)", Jun. 2021, 172 pages.

(Continued)

*Primary Examiner* — Jae Y Lee
*Assistant Examiner* — Haeshil Jessica Choi
(74) *Attorney, Agent, or Firm* — McCarter & English, LLP

(57) ABSTRACT

For a network node in wireless communication with a UE, filling a TB such that at least two data with different reliability requirements are mapped to separate CBs. The network node applies different MCSs to at least the separate CBs comprising the data with different reliability requirements within the transport block. The network node transmits the TB toward the UE after the different MCSs have been applied. The UE can use a similar technique in UL in order to transmit. The UE may also receive the TB from the network node. The UE decodes and performs error checking of the CBs based on the corresponding MCSs that were applied.

20 Claims, 9 Drawing Sheets

(56) References Cited

OTHER PUBLICATIONS

3GPP TS 38.213 V17.2.0, "3$^{rd}$ Generation Partnership Project; Technical Specification Group Radio Access Network; NR; Physical layer procedures for control (Release 17)", Jun. 2022,155 pages.
3GPP TS 38.321 V17.1.0, "3$^{rd}$ Generation Partnership Project; Technical Specification Group Radio Access Network; NR; Medium Access Control (MAC) protocol specification (Release 17)", Jun. 2022,241 pages.
3GPP TR 38.828 V16.1.0, "3$^{rd}$ Generation Partnership Project; Technical Specification Group Radio Access Network; Cross Link Interference (CLI) handling and Remote Interference Management (RIM) for NR; (Release 16)", Sep. 2019, 96 pages.
Yaqoob, Abid, et al., "A Survey on Adaptive 360° Video Streaming: Solutions, Challenges and Opportunities", IEEE Communications Surveys & Tutorials, vol. 22, No. 4, Jul. 2020, 39 pages.
Khosravirad, S.R., et al., "Flexible multibit feedback design for HARQ operation of large-size data packets in 5G", 2017 IEEE 85$^{th}$ Vehicular Technology Conference (VTC Spring), Jun. 2017, pp. 1-5.
Wu, J., "Multilevel code-block group based HARQ-ACK control channel design," IEEE 2018 International Conference on Computing, Networking and Communication (ICNC), Mar. 2018, pp. 264-268.
Pedersen, K.I., et al., "Rethink hybrid automatic repeat request design for 5G: Five configurable enhancements," IEEE Wireless Communications Magazine, vol. 24, No. 6, Dec. 2017, pp. 154-160.
5G/NR—PUCCH, downloaded from https://www.sharetechnote.com/html/5G/5G_UCI.html; Jul. 19, 2022, 8 pages.

\* cited by examiner

LINK ADAPTATION WITHIN TRANSPORT BLOCKS

TECHNICAL FIELD

Exemplary embodiments herein relate generally to wireless communications and, more specifically, relates to link adaptation in the communications.

BACKGROUND

To improve efficiency and latency in 5G NR (fifth generation, new radio), a concept called Code Block Groups (CBGs)-based transmission has been introduced. This technique divides a larger transport block (TB) into smaller code blocks, and the smaller code blocks are further grouped into CBGs.

A user equipment (UE) will decode these CBGs and will send HARQ (hybrid automatic repeat request) feedback (e.g., ACK, acknowledgement, or NACK, negative acknowledgement) for each of the individual groups. A benefit to this type of system is that the individual CBGs can be sent and received, and an error in reception of one of the individual CBGs means only that CBG—and not the entire TB—has to be resent.

There can be added complexity, however. In particular, packets from different radio bearers (RBs) can be multiplexed into one transport block (TB), e.g., as different data segments on the TB. The TB may be transmitted using link adaptation (LA), where certain parameters such as a modulation and coding scheme (MCS) are matched to conditions on a radio link.

While LA and CBG with HARQ have benefits, these could still be improved.

BRIEF SUMMARY

This section is intended to include examples and is not intended to be limiting.

In an exemplary embodiment, a method is disclosed that includes, for a network node in wireless communication with a user equipment, filling a transport block such that at least two data with different reliability requirements are mapped to separate code blocks. The method includes applying by the network node different modulation and coding schemes to at least the separate code blocks comprising the data with different reliability requirements within the transport block. The method further includes transmitting, from the network node toward the user equipment, the transport block after the different modulation and coding schemes have been applied.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus at least to: for a network node in wireless communication with a user equipment, fill a transport block such that at least two data with different reliability requirements are mapped to separate code blocks; applying by the network node different modulation and coding schemes to at least the separate code blocks comprising the data with different reliability requirements within the transport block; and transmit, from the network node toward the user equipment, the transport block after the different modulation and coding schemes have been applied.

An exemplary computer program product includes a computer-readable storage medium bearing computer program code embodied therein for use with a computer. The computer program code includes: code, for a network node in wireless communication with a user equipment, for filling a transport block such that at least two data with different reliability requirements are mapped to separate code blocks; code for applying by the network node different modulation and coding schemes to at least the separate code blocks comprising the data with different reliability requirements within the transport block; and code for transmitting, from the network node toward the user equipment, the transport block after the different modulation and coding schemes have been applied.

In another exemplary embodiment, an apparatus comprises means for performing: for a network node in wireless communication with a user equipment, filling a transport block such that at least two data with different reliability requirements are mapped to separate code blocks; applying by the network node different modulation and coding schemes to at least the separate code blocks comprising the data with different reliability requirements within the transport block; and transmitting, from the network node toward the user equipment, the transport block after the different modulation and coding schemes have been applied.

In an exemplary embodiment, a method is disclosed that includes receiving, by a user equipment in wireless communication with a network node, a transport block from the network node. Different modulation and coding schemes have been applied to at least two different code blocks within the transport block. Data in code blocks to which different modulation and coding schemes have been applied have different reliability requirements. The method includes decoding and performing, by the user equipment, error checking of the code blocks based on the corresponding modulation and coding schemes that were applied.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus at least to: receive, by a user equipment in wireless communication with a network node, a transport block from the network node, where different modulation and coding schemes have been applied to at least two different code blocks within the transport block, wherein data in code blocks to which different modulation and coding schemes have been applied have different reliability requirements; and decode and perform, by the user equipment, error checking of the code blocks based on the corresponding modulation and coding schemes that were applied.

An exemplary computer program product includes a computer-readable storage medium bearing computer program code embodied therein for use with a computer. The computer program code includes: code for receiving, by a user equipment in wireless communication with a network node, a transport block from the network node, where different modulation and coding schemes have been applied to at least two different code blocks within the transport block, wherein data in code blocks to which different modulation and coding schemes have been applied have different reliability requirements; and code for decoding and performing, by the user equipment, error checking of the code blocks based on the corresponding modulation and coding schemes that were applied.

In another exemplary embodiment, an apparatus comprises means for performing: receiving, by a user equipment in wireless communication with a network node, a transport block from the network node, where different modulation and coding schemes have been applied to at least two different code blocks within the transport block, wherein data in code blocks to which different modulation and coding schemes have been applied have different reliability requirements; and decoding and performing, by the user equipment, error checking of the code blocks based on the corresponding modulation and coding schemes that were applied.

In an exemplary embodiment, a method is disclosed that includes, for a user equipment in wireless communication with a user network node, filling a transport block such that at least two data with different reliability requirements are mapped to separate code blocks. The method includes applying by the user equipment different modulation and coding schemes to at least the separate code blocks comprising the data with different reliability requirements within the transport block. The method also includes transmitting, from the user equipment toward the network node, the transport block after the different modulation and coding schemes have been applied.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus at least to: for a user equipment in wireless communication with a user network node, fill a transport block such that at least two data with different reliability requirements are mapped to separate code blocks; apply by the user equipment different modulation and coding schemes to at least the separate code blocks comprising the data with different reliability requirements within the transport block; and transmit, from the user equipment toward the network node, the transport block after the different modulation and coding schemes have been applied.

An exemplary computer program product includes a computer-readable storage medium bearing computer program code embodied therein for use with a computer. The computer program code includes: code, for a user equipment in wireless communication with a user network node, for filling a transport block such that at least two data with different reliability requirements are mapped to separate code blocks; code for applying by the user equipment different modulation and coding schemes to at least the separate code blocks comprising the data with different reliability requirements within the transport block; and code for transmitting, from the user equipment toward the network node, the transport block after the different modulation and coding schemes have been applied.

In another exemplary embodiment, an apparatus comprises means for performing: for a user equipment in wireless communication with a user network node, filling a transport block such that at least two data with different reliability requirements are mapped to separate code blocks; applying by the user equipment different modulation and coding schemes to at least the separate code blocks comprising the data with different reliability requirements within the transport block; and transmitting, from the user equipment toward the network node, the transport block after the different modulation and coding schemes have been applied.

DETAILED DESCRIPTION OF THE DRAWINGS

Figure 1:
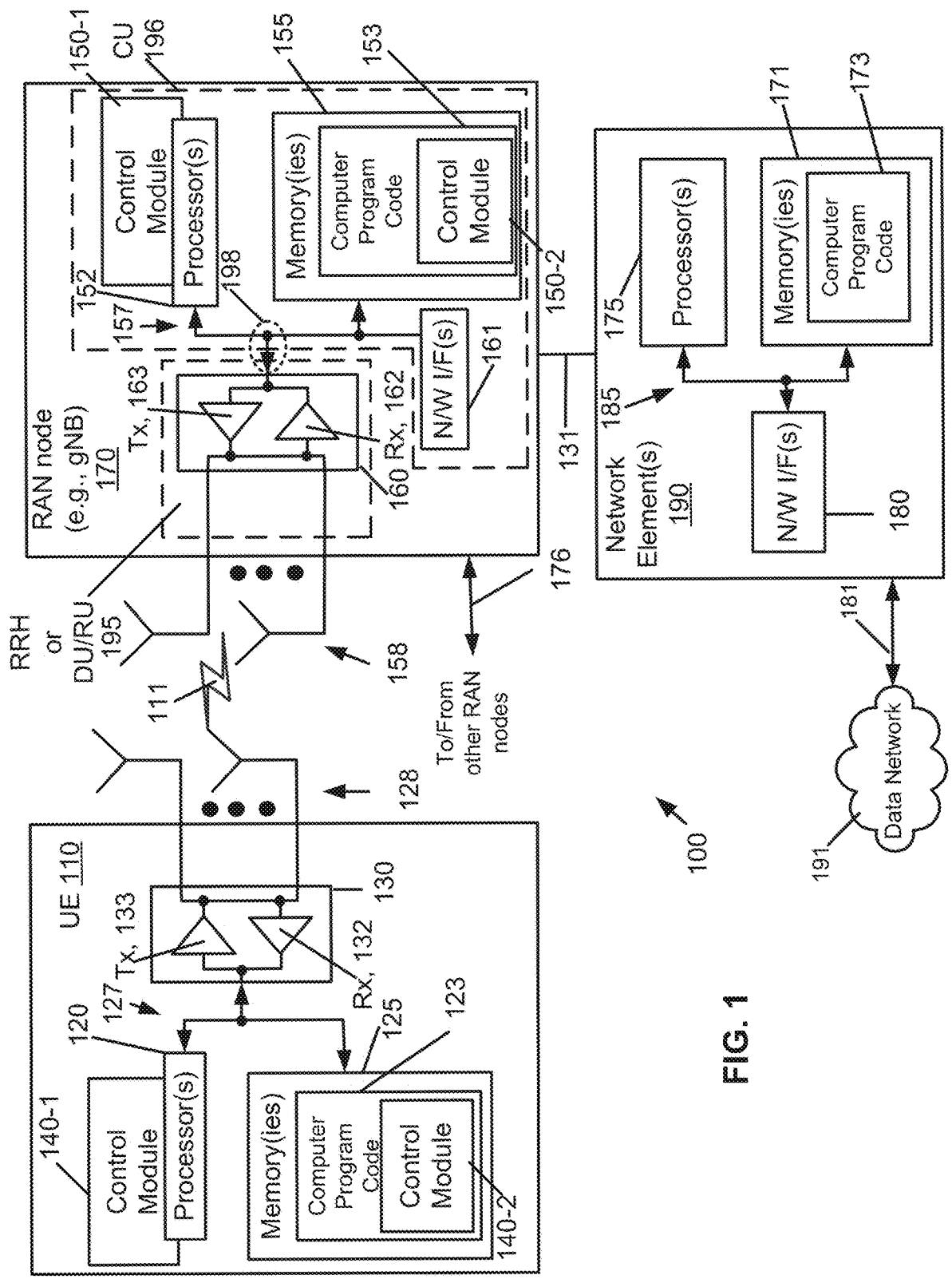
FIG. 1 is a block diagram of one possible and non-limiting exemplary system in which the exemplary embodiments may be practiced.

Abbreviations that may be found in the specification and/or the drawing figures are defined below, at the end of the detailed description section.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

When more than one drawing reference numeral, word, or acronym is used within this description with "/", and in general as used within this description, the "/" may be interpreted as "or", "and", or "both".

As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

The exemplary embodiments herein describe techniques for link adaptation schemes for CBG-based transmissions of transport blocks with different data segments. Additional description of these techniques is presented after a system into which the exemplary embodiments may be used is described.

Turning to FIG. 1, this figure shows a block diagram of one possible and non-limiting exemplary system in which the exemplary embodiments may be practiced. A user equipment (UE) 110, radio access network (RAN) node 170, and network element(s) 190 are illustrated. In FIG. 1, a user equipment (UE) 110 is in wireless communication with a wireless network 100.

A UE is a wireless, typically mobile device that can access a wireless network. The UE 110 includes circuitry comprising one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a control module 140, comprising one of or both parts 140-1 and/or 140-2, which may be implemented in a number of ways. The control module 140 may be implemented in hardware as control module 140-1, such as being implemented as part of the one or more processors 120. The control module 140-1 may be implemented also as an integrated circuit or through other hardware such as a programmable gate array. In another example, the control module 140 may be implemented as control module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 is a network node such as a base station that provides access by wireless devices such as the UE 110 to the wireless network 100. Herein, the RAN node 170 will be referred to as a gNB, although the following text makes it clear that this is an example. The RAN node 170 may be, for instance, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (e.g., the network element(s) 190). The ng-eNB is a node providing E-UTRA user plane and control plane protocol terminations towards the UE, and connected via the NG interface to the 5GC. The NG-RAN may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-DU supports one or multiple cells. One cell is supported by one gNB-DU. The gNB-DU terminates the F1 interface 198 connected with the gNB-CU. Note that the DU 195 is considered to include the transceiver 160, e.g., as part of an RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station. Thus, the RAN node 170 may be many different network nodes.

The RAN node 170 includes circuitry comprising one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a control module 150, comprising one of or both parts 150-1 and/or 150-2, which may be implemented in a number of ways. The control module 150 may be implemented in hardware as control module 150-1, such as being implemented as part of the one or more processors 152. The control module 150-1 may be implemented also as an integrated circuit or through other hardware such as a programmable gate array. In another example, the control module 150 may be implemented as control module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the control module 150 may be distributed, such as being distributed between the DU 195 and the CU 196, or be implemented solely in the DU 195.

The one or more network interfaces 161 communicate over a network such as via the links 176 and 131. Two or more RAN nodes 170 communicate using, e.g., link 176. The link 176 may be wired or wireless or both and may implement, e.g., an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, e.g., fiber optic cable or other suitable network connection to connect the other elements (e.g., a central unit (CU), gNB-CU) of the RAN node 170 to the RRH/DU 195. Reference 198 also indicates those suitable network link(s).

The wireless network 100 may include a network element or elements 190 that may include core network functionality, and which provides connectivity via a link or links 181 with a data network 191, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity) functionality and/or SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes circuitry comprising one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor-based memory devices, flash memory, firmware, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general-purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones (such as smart phones, mobile phones, cellular phones, voice over Internet Protocol (IP) (VoIP) phones, and/or wireless local loop phones), tablets, portable computers, vehicles or vehicle-mounted devices for, e.g., wireless V2X (vehicle-to-everything) communication, image capture devices such as digital cameras, gaming devices, music storage and playback appliances, Internet appliances (including Internet of Things, IoT, devices), IoT devices with sensors and/or actuators for, e.g., automation applications, as well as portable units or terminals that incorporate combinations of such functions, laptop-embedded equipment (LEE), laptop-mounted equipment (LME), Universal Serial Bus (USB) dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. That is, the UE 110 could be any end device that may be capable of wireless communication. By way of example rather than limitation, the UE may also be referred to as a communication device, terminal device (MT), a Subscriber Station (SS), a Portable Subscriber Station, a Mobile Station (MS), or an Access Terminal (AT).

Having thus introduced one suitable but non-limiting technical context for the practice of the exemplary embodiments, the exemplary embodiments will now be described with greater specificity.

As an overview, the exemplary embodiments herein are related to improved link adaptation (LA) for use cases where a transport block includes data from different radio bearers (RBs) that contain data with different reliability constraints. It is furthermore assumed that the usage of code block group (CBG) based Hybrid Automatic Repeat request (HARQ) is as already supported in the current 5G NR standard. More specifically, a new enhanced mode is proposed, where data from RBs are mapped to different CBGs. Those are enabled to be sent with different reliabilities, although being scheduled with a single dynamic scheduling grant, and they belong to the same transport block. This is clearly different from current 5G NR techniques, where each transmission of a transport block is sent with a single unique modulation scheme over the wireless channel, resulting in the same block error rate (BLER) of data in the transport block.

The examples herein may be relevant for 5G-Advanced Release 18 item on Enhancements for XR. For advanced XR use cases, with different frames types, having different priorities, the exemplary embodiments herein are relevant. Exemplary embodiments are also relevant for multiplexing of user- and control-plane traffic in one transport block (including cases with mux, multiplexing, and, e.g., a critical RRC handover command and best effort eMBB data in one transport block). Herein, solutions for downlink transmissions are focused on, although the techniques are not limited to these.

Figure 2:
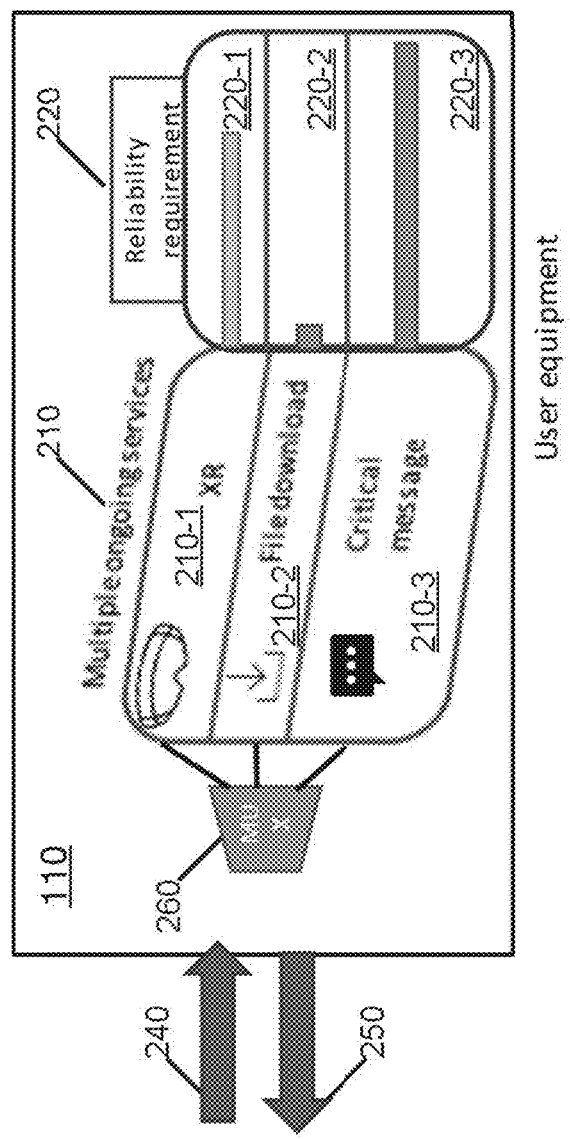
FIG. 2 illustrates multiple simultaneous services multiplexed into one transport block
Figure 2:
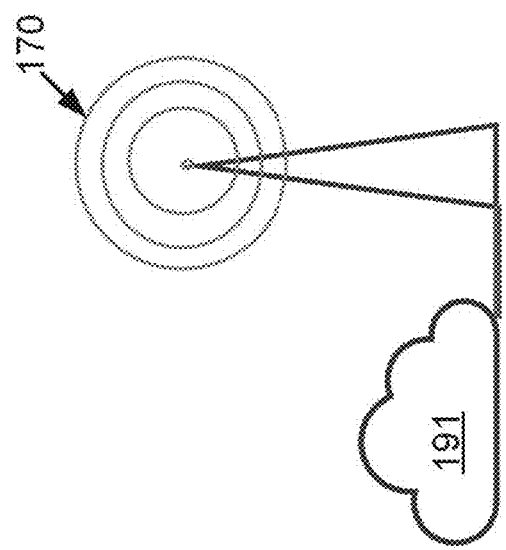

A simple example of a use case is shown in FIG. 2, where multiple services 210 are running on one user equipment 110 and each of these services 210 has a different reliability requirement 220. Both downlink 240 (from the gNB 170 to the UE 110) and uplink 250 (from the UE 110 to the gNB 170) are illustrated. The mux (multiplexer) 260 is used to create a single output for uplink 250 or to create data for the three services 210 from a single stream in downlink 240. The multiple ongoing services 210 are the XR 210-1, a file download 210-2, and a critical message 210-3, having corresponding reliability requirements 220 of fairly high 220-1, low 220-2, and very high 220-3. The exemplary embodiments herein allow multiplexing the data from these services into one transport block while reliability of each of the services is ensured separately.

Figure 3:
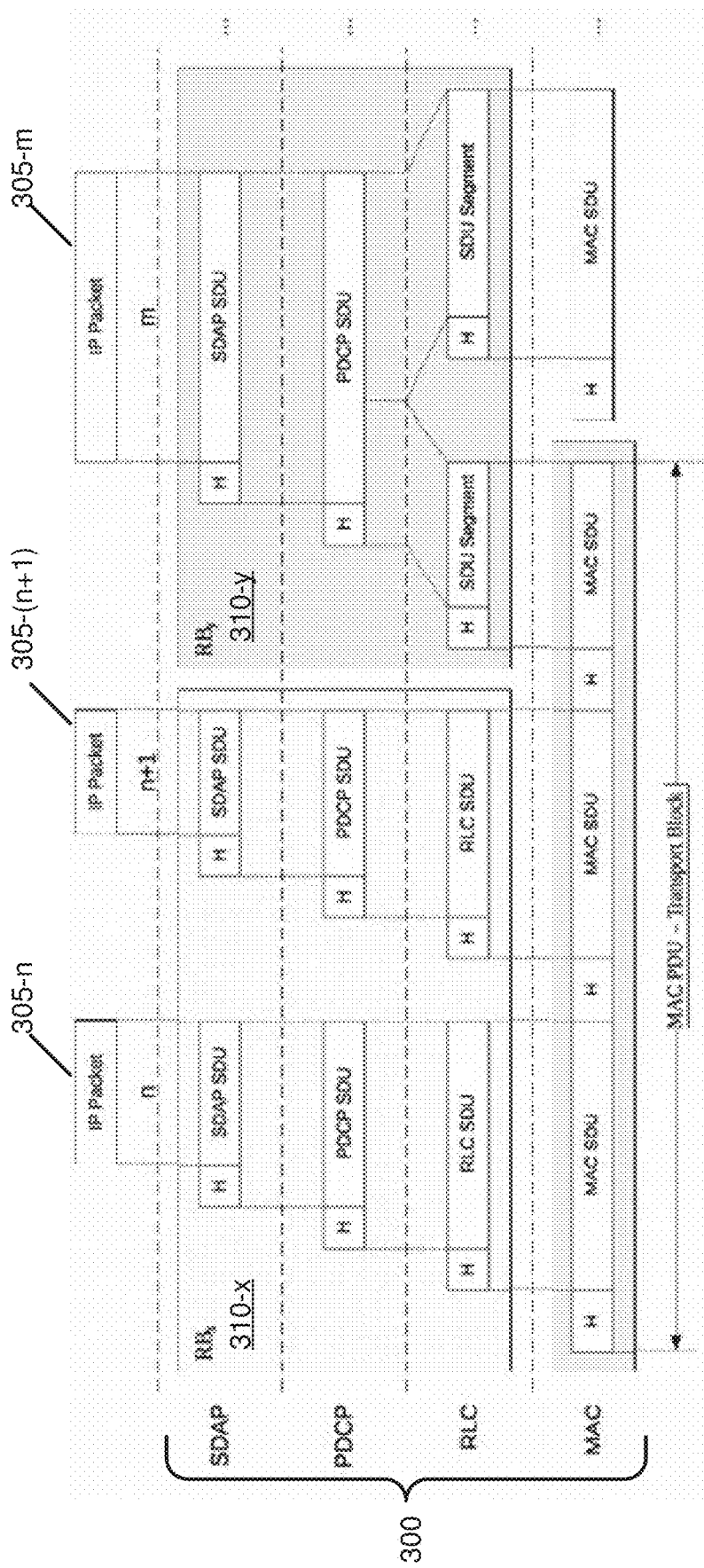
FIG. 3 is an example of mapping different IP packet flows to different radio bearers onto one MAC PDU that is sent (or at least scheduled) in one transport block.

In terms of issues that the instant exemplary embodiments may address, consider the following. Multiplexing packets from different radio bearers (RBs) into one transport block (TB) is supported by the current 5G NR specifications, as this technique increases the efficiency as compared to separately transmitting data from different RBs in different TBs (using different scheduling grants). This is illustrated in FIG. 3, where it is shown how mapping different IP packet flows to different radio bearers onto one MAC PDU, which is sent (or at least scheduled) in one transport block. A protocol stack 300 is illustrated. The source of this figure is 3GPP TS 38.300, although reference numbers have been added to the figure. For any additional information about this figure, please see 3GPP TS 38.300, e.g., V15.3.1 (2018-10). In this example, the transport block 320 includes IP packets n 305-$n$ and n+1 305-$(n+1)$ from the $RB_x$ 310-$x$ and part of an IP packet 305-$m$ from $RB_y$ 310-$y$.

Using CBG-based HARQ transmissions help increase resource efficiency on re-transmissions, also supported by the current 5G NR specifications. Transmission of one TB is limited to be sent with a single unique modulation and coding scheme (MCS), implying a single block error rate for the transmission. That is, if a TB, e.g., includes data from two RBs that have reliability targets of 0.001% and 10%, respectively, the selected MCS for the transmission needs to be chosen according to the strictest reliability of 0.001%, which is rather sub-optimal for sending the data of the RB with the 10% reliability target.

Hence, one problem addressed herein is the following: Overcoming the current 5G NR limitations, where all data in a single transport block is sent with the same reliability target, using one unique MCS for the full TB. In addressing this challenge, a solution is provided in an exemplary embodiment herein with a new scheduling grant for the downlink and a new formatting scheme for preparing the PDSCH transmission and procedure for the UE to decode the formatting scheme.

This is a relevant problem for 5G-Advanced, which clearly is lacking the flexibility to efficiently multiplex data with different reliability targets on one TB. This is, e.g., useful for the following example use cases:

1) Mux (multiplex) of eMBB data and critical RRC message (e.g., handover command) in one TB.
2) Mux of URLLC/TSN and eMBB in one TB.
3) Mux of XR I-, P-, and/or B-frames in one TB (see details of such frame types in, e.g., 3GPP TR 38.828, and also in the following publication: A. Yaqoob, T. Bi, and G. M. Muntean, "A Survey on Adaptive 360° Video Streaming: Solutions, Challenges and Opportunities," IEEE Commun. Surv. & Tutor., vol. 22, no. 4, 2020).
4) Mux of VoIP and best effort eMBB in one TB.
5) Mux of VoIP and Video in one TB.

Common for the cases listed above is that the TB includes data with potentially very different reliability requirements. Ranging from the strictest cases with 10-9 reliability for the most challenging TSN case to $10^{-1}$ to $3 \times 10^{-1}$ for best effort eMBB. Another use case could be the scenario where a delay-sensitive (without stringent reliability requirements) service is multiplexed with others and the delay budget of the service is close to its end. In this case, since there is not enough time for retransmissions, sending the packets with a higher reliability can ensure timely delivery. Therefore, a lower MCS can be set for the packets from that service when the delay budget is close and the default MCS can be used otherwise. As is known, the phrase "lower MCS" is commonly interpreted as "lower modulation order and/or lower code rate", which generally provides for higher reliability at the cost of lower spectral efficiency. As an example of setting MCS, one RB carrying XR Video may have one packet buffered that is close to its packet delay budget (PDB), and second packet which have several milliseconds before reaching its PDB. More efficient transmission of those two packets in one TB can therefore happen with different BLEPs (i.e., the packet which is about to expire should have virtually zero BLEP while the other one may have 10%-20% to maximize spectral efficiency), but in one TB to minimize control overhead.

The current 5G NR specifications include options for multiplexing different IP packets, and data from different RBs into one MAC PDU as pictured in FIG. 3 (see an overview in 3GPP TS 38.300). Prior to the actual transmission of MAC PDU in one transport block on the downlink physical-layer, the following processing steps happen:

1. Transport block CRC attachment;
2. Code block segmentation and code block CRC attachment;
3. Channel coding: LDPC coding;
4. Physical-layer hybrid-ARQ processing;
5. Rate matching;
6. Scrambling;
7. Modulation: QPSK, 16QAM, 64QAM, 256QAM, and 1024QAM;
8. Layer mapping;
9. Mapping to assigned resources and antenna ports.

At the UE side, corresponding actions are taken in an inverse order to recreate the initial TB and to recover the transmitted MAC PDU (assuming no errors).

Notice from these steps that each TB is sent with a single unique channel coding and modulation scheme, independent of whether the TB contains data from RBs with different reliability targets. This is a problem, as it means that the gNB must select the MCS according to strictest reliability target of the data that are part of the TB, i.e., the task of the so-called gNB link adaptation mechanism.

Options with CBG-based HARQ transmission is also supported by 5G NR. CBG-based transmissions are specified in 3GPP TS 38.214, in Section 5.1.7 entitled "Code block group based PDSCH transmission". Details of HARQ feedback for CBG based transmissions are specified in 3GPP TS 38.213, section 9.1.1 "CBG-based HARQ-ACK codebook determination". Aspects of CBG-based transmissions also appear in the MAC specification (3GPP TS 38.321). The basic principle is that the TB is organized into multiple Code Blocks (CBs). The maximum size of a CB is 8448 bits. As an example, a CB is a set of data bits with an attached CRC wherein the size of a CB is limited in accordance with size(s) supported by the channel coding (e.g., LDPC block sizes or Convolutional Turbo Code interleaver sizes). The CBs may be grouped into CBGs. For each received TB, the receiver provides feedback to indicate which CBGs are in error, and only the erroneously received CBGs are thereafter retransmitted by the transmitter. For transmission of large TB sizes (as is the case for XR use cases as defined in 3GPP TR 38.838) such techniques are promising. Cases with up to 8 CBGs per TB are supported by current NR specs. More generally, the maximum number of CBGs per TB is configurable as $C \in \{2,4,6,8\}$ for the PDSCH.

The Physical Downlink Control Channel (PDCCH) is used to schedule DL transmissions on PDSCH and UL transmissions on PUSCH, where the Downlink Control Information (DCI) on PDCCH includes:
1) Downlink assignments containing at least modulation and coding format, resource allocation, and hybrid-ARQ information related to DL-SCH; and
2) Uplink scheduling grants containing at least modulation and coding format, resource allocation, and hybrid-ARQ information related to UL-SCH.

Notice that there is one DL scheduling grant per UE, per carrier only, and that the grant includes one modulation and coding format (also known as MCS) per codeword. The DCI formats for DL scheduling on the PDSCH are the following: Format 1_0 and Format 1_1 (see details in 3GPP TS 38.212 and 38.214). Those DL scheduling DCI formats include 5 bits for signaling the MCS that is used for the transmission of the scheduled TB for each codeword. For UL, Format 0_0 and 0_1 may be used that use 5 bits to indicate the MCS index.

Now that issues with conventional techniques have been described, an introduction to the exemplary embodiments is provided. For cases where the gNB schedules a UE with one TB that contains data from multiple RBs with different reliability constraints, one exemplary proposed method is summarized as follows:
1. The gNB fills the TB such that data from each RB are mapped so the data end up being part of different CBs or CBGs. For the case with two RBs, data from RB #1 are mapped to CBs 1 to N, and data from RB #2 are mapped to CBs N+1 to M, where N and M are integers, and M>N. In performing this operation, the gNB may use zero padding if data for the RBs are not sufficient to fully fill the CBs.
2. The gNB thereafter prepares the downlink physical-layer transmission, e.g., using one or more of the following:
    a) Transport block CRC attachment;
    b) Code block segmentation and code block CRC attachment;
    c) Applying channel coding (e.g., LDPC coding) with potentially different effective coding rates per CB (or CBG);
    d) Rate matching;
    e) Scrambling; or
    f) Applying modulation (QPSK, 16QAM, 64QAM, 256QAM, and 1024QAM). In one embodiment, the same modulation is used for the full TB, while in a second embodiment, different modulation schemes are used per CB (or CBG) only.
3. The UE is scheduled by the gNB by, e.g., sending a new DCI format that informs the UE that transmission is coming on the PDSCH, where different CBs (or CBGs) in the transmissions may be with different MCS. Typically, the transmissions use more conservative MCS for the CBs that carry data from RBs with the stricter reliability constraints, and more aggressive MCS for the CBs that carry data from RBs with more relaxed reliability constraints. More information about MCS can be found in 3GPP TS 38.214 section 5.1.3.1, where it is mentioned that the UE uses $I_{MCS}$ and one of the tables 5.1.3.1-1 to 5.1.3.1-4 to determine the modulation order and code rate used in the physical downlink shared channel. See, e.g., 3GPP TS 38.214 V16.6.0 (2021-06).

Regarding having the same modulation for all CBG/CB, but providing variable reliabilities among the CBGs/CBs, different code rates can be used. The options for different code rates vary depending on the chosen modulation order. For instance, from table 5.1.3.1-1 in 3GPP TS 38.214, there are 10 and 7 different code rates for modulation orders of 2 and 4, respectively. Thus, the code rate options are not fixed and are determined after selecting the base modulation order.
4. The UE decodes the new DCI format and the corresponding PDSCH transmissions, considering that different CBs may be sent with different MCS.
5. The UE starts the reception procedure as follows:
    a. Demodulation of different CBs (or CBGs) based on the modulation order notified by the DCI for each part of the TB. In one embodiment, if the modulation order is fixed for the full TB, demodulation may be performed once for all the CBs (and CBGs);
    b. Descrambling;
    c. Rate matching;
    d. Applying channel decoding (LDPC decoding) where different code rates may be present per CB (or CBG). Effective code rate information is accessible from the corresponding received DCI.
    e. Code block CRC check;
6. Based on CRC per CB, the UE determines which CBGs are received correctly, and which ones are in error and feeds back the corresponding ACK/NACK messages to the gNB.
7. If all the CRCs of CBs indicate correct reception, the UE concatenates the CBs and recreates the original TB.
8. CRC checks for the full TB and forwards the TB to higher layers for further processes.

As yet another embodiment, step 1 above could also be used for cases where data packets from one RB with different latencies remaining before reaching their PDB are mapped to different CBs or CBGs. As example, consider an example where there are two packets buffered for a certain RB. Packet #1 is very close to reaching its PDB, so this packet must be sent with very high reliability. A second buffered packet (Packet #2) may have time left for one or more retransmissions before reaching its PDB, and hence can be sent with a relaxed BLEP to maximize spectral efficiency. With a proposed exemplary embodiment, those two packets are sent in one TB, while respecting their differences in BLEP transmission requirements.

A similar procedure can be applied in the uplink direction and for the transmission of PUCCH/PUSCH. In these scenarios, the UE maps the data from each of RBs so they end up being part of different CBs (or CBGs). Similarly, modulation and coding steps may use different parameters for each of the CBs (or CBGs) to match the reliability requirements of each of the corresponding RBs. Correspondingly, at the gNB side the reception is done by taking into account the MCS variations among different CBs (or CBGs). Referring to the itemized steps above, steps 1-2 are performed by the UE, in some embodiments after receiving information in an associated DCI and/or RRC message for the PUSCH transmission similar to that described in steps 3-4 for PDSCH reception, while steps 5-8 are performed by the gNB, when applying proposed examples herein for PUSCH (uplink) transmissions. Optionally, for example in the case of a Configured Grant, additional steps of the UE sending, and the gNB receiving, a UCI comprising information on the MCS variations within a TB may be introduced.

One exemplary advantage and technical effect of the proposed solutions is that the solutions enable optimized downlink and uplink transmissions of TBs with data from different RBs that have diverse reliability requirements, e.g., enabling to send a TB with URLLC data in CBs (of CBG) with a very conservative MCS as well as eMBB with in other CBs (or CBGs) with a more aggressive MCS to have higher spectral efficiency. Similarly, exemplary solutions allow optimized TB transmission that, e.g., contain video/audio data with different reliability targets as is relevant for XR use cases. This is a clear advantage as compared to today's functionality, where the gNB and UE have to select the MCS for TB according to the data in the TB with the strictest reliability constraints. It is equivalent of enabling higher application awareness into the 5G-Advanced system as is one of the objectives for Rel-18 XR item.

Figure 4:
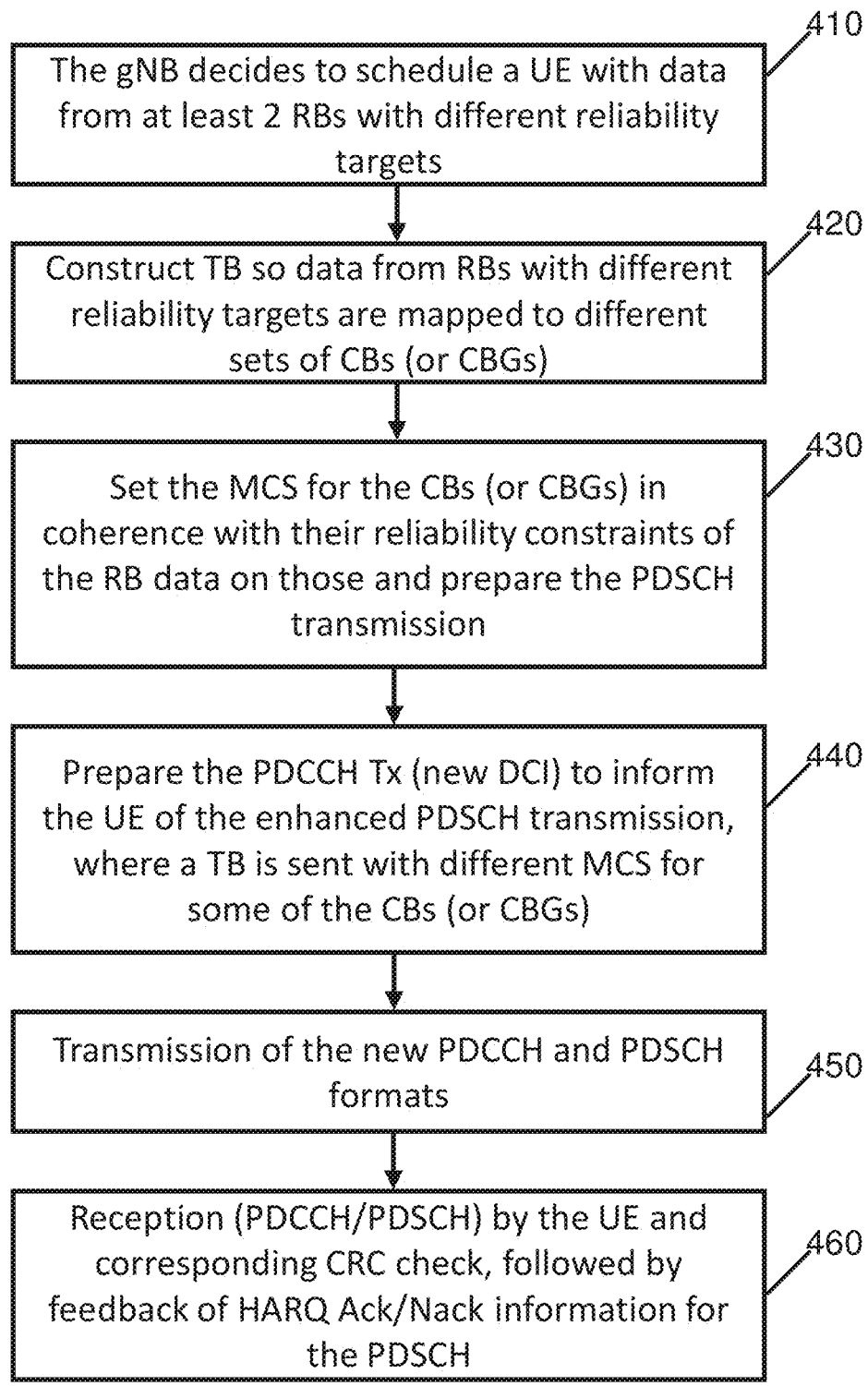
FIG. 4 is a logic flow diagram providing a summary of an overall exemplary procedure of the proposed technique in downlink, in accordance with an exemplary embodiment.

In line with the overview above, FIG. 4 summarizes exemplary various procedural steps in greater detail. That is, FIG. 4 is a logic flow diagram having a summary of an overall exemplary procedure of the proposed technique. FIG. 4 also illustrates the operation of an exemplary method, a result of execution of computer program instructions embodied on a computer readable memory, functions performed by logic implemented in hardware, and/or interconnected means for performing functions in accordance with an exemplary embodiment. This figure starts with actions at the gNB side and includes actions by both the UE 110 and the gNB 170. The UE 110 is under control of the control module 140, and the gNB 170 is under control of the control module 150, in order to perform the operations in FIG. 4.

FIG. 4 starts in block 410 by the gNB deciding to transmit a TB 320 with data from multiple (at least two) RBs 310 with various reliability targets. For this purpose, note that data with the same or substantially similar reliability requirements can be aggregated in the same code blocks or code block groups using the same MCS and data with substantially different reliability requirements can be separated into different code blocks or code block groups using different MCS(s), such that the number of MCSs applied to a TB can be less than the number of different reliability requirements for the data in the TB. For instance, IP packet #n and #n+1 may have the same or substantially similar reliability requirements, whereas they have substantially different reliability requirements from IP packet #m and #k. See FIG. 6 below for an example.

How large the substantial difference needs to be to merit putting data in different CBs or CBGs encoded with different MCS is a matter of implementation choice. One exemplary reason for this, among others, is that data from one bearer may have different reliability requirements based on the PDB of the data, so it may not be the bearer that is the key consideration, but rather the reliability requirements of individual packets.

In one example, the substantial difference may be considered to exist between data for which the PDB is considered to allow no further retransmissions and data for which the PDB is considered to allow at least one further retransmission. Substantial similarity may be considered to exist between data with PDBs that each do not allow further retransmission, or between data with PDBs that each do allow for at least one retransmission, or between data with PDBs allowing a same number of retransmissions. Such a distinction may be expressed in the form of one or more PDB time thresholds.

In another example, the substantial difference may be considered to exist if the difference or ratio in desired BLERs exceeds a certain threshold, for example an order of magnitude. In some implementations, such a threshold may vary with the size of a data, such that the larger the data, the lower the threshold. Or in different terms, whether reliability requirements are considered substantially similar or substantially different may vary with the resulting spectral efficiency. Considering for example two data, of which the data requiring lower reliability consists of just a few bytes and the data requiring higher reliability consists of many bytes. Encoding these data with different MCSs would not meaningfully improve the resulting spectral efficiency unless the difference in desired BLER was very large, e.g., a number of orders of magnitude. On the other hand, if the data requiring lower reliability consists of many bytes, encoding these data with different MCSs would meaningfully improve the resulting spectral efficiency even when the difference in reliability requirements was for example no more than represented by one index number difference in the applied MCS table.

In yet another example in which the determination between substantially similar and substantially different reliability may be dependent on the resulting spectral efficiency, consider two data that based on their desired BLER could be encoded with different MCS, for example MCSs with sequential index numbers in the MCS table. Consider then one example in which such different MCS encoding would merely result in adding more padding bits to fully fill the TB or a same number of CBs or CBGs as compared to using the same lowest of the two MCSs for both data, such that the resulting spectral efficiency would not change at all. Such two data may hence between considered to have substantially similar reliability requirements, because the difference in reliability does not allow for different MCS encoding to provide a spectral efficiency benefit. On the other hand, if encoding with the same lower MCS would for example require the two data to be segmented over two TBs, whereas using the different MCS would allow the data to be contained in a single TB, the improvement in spectral efficiency would merit considering the data substantially different and applying the MCS with sequential index numbers in the MCS table.

In yet another example, where a TB is configured to allow its CBs or CBGs to be encoded with a given maximum number of different MCSs, and the amount of data with different reliability requirements exceeds that given maximum, the data with closest reliability requirements may be successively grouped and considered substantially similar, until the number of such groups equals the given maximum number, wherein the groups of data are considered substantially different.

This scheduling is performed by the gNB 170 constructing the TB 320 such that data from each RB 310 end up being mapped to different CBs or CBGs. See block 420. For the case with two RBs 310, data from RB #1 are mapped to CBs 1 to N, and data from RB #2 are mapped to CBs N+1 to M, where N and M are integers, and M>N. In performing this operation, the gNB 170 may use zero padding if data for the RBs are not sufficient to fully fill the CBs. Thereafter, the gNB 170 prepares the downlink physical-layer transmission on the PDSCH while allowing potentially different MCS's for CBs (or CBGs) as follows, using one or more of the following:

1. Transport block CRC attachment;
2. Code block segmentation (ensuring the RB mapping) and code block CRC attachment;

3. Applying channel coding (LDPC coding) with potentially different effective coding rates per CB (or CBG);
4. Rate matching;
5. Scrambling; or
6. Applying modulation (QPSK, 16QAM, 64QAM, 256QAM, and 1024QAM). In one embodiment, we use same modulation for the full TB, while in a second embodiment we allow to use different modulation schemes per CB (or CBG) only.

That is, the gNB 170 sets the MCS for the CBs (or CBGs) in coherence with their reliability constraints of the RB data on those CBs (or CBGs) and prepares the PDSCH transmission. See block 430. The UE is scheduled by the gNB by preparing (see block 440) a new DCI format that informs the UE that transmission is coming on the PDSCH, where different CBs (or CBGs) in the transmissions may be with different MCSs. This typically uses more conservative MCS for the CBs that carry data from RBs with the stricter reliability constraints, and more aggressive MCS for the CBs that carry data from RBs with more relaxed reliability constraints. The gNB can choose (see block 430) MCS for the data belong to the same RB from CQI feedback from UE, as well as 5QI information from the RBs. If the UE, e.g., reports that the UE can support MCS #X and MCS #Y for achieving 10% and 0.0001% BLock Error Probabilities (BLEP), respectively, the gNB 170 could use that to select the MCS for CBGs that carry data from RBs with such reliability targets. Note that current NR specifications already allow the gNB to configure the UE to report CQIs corresponding to different BLEP targets. The gNB transmits the new PDCCH and PDSCH formats in block 450.

The UE receives and decodes (block 460) the new DCI format and the corresponding PDSCH transmissions, considering that different CBs may be sent with different MCS. This may involve corresponding CRC checks. Based on CRC per CB, the UE determines which CBGs are received correctly, and which ones are in error and feeds back the corresponding ACK/NACK messages (as part of a HARQ scheme) to the gNB.

Figure 4A:
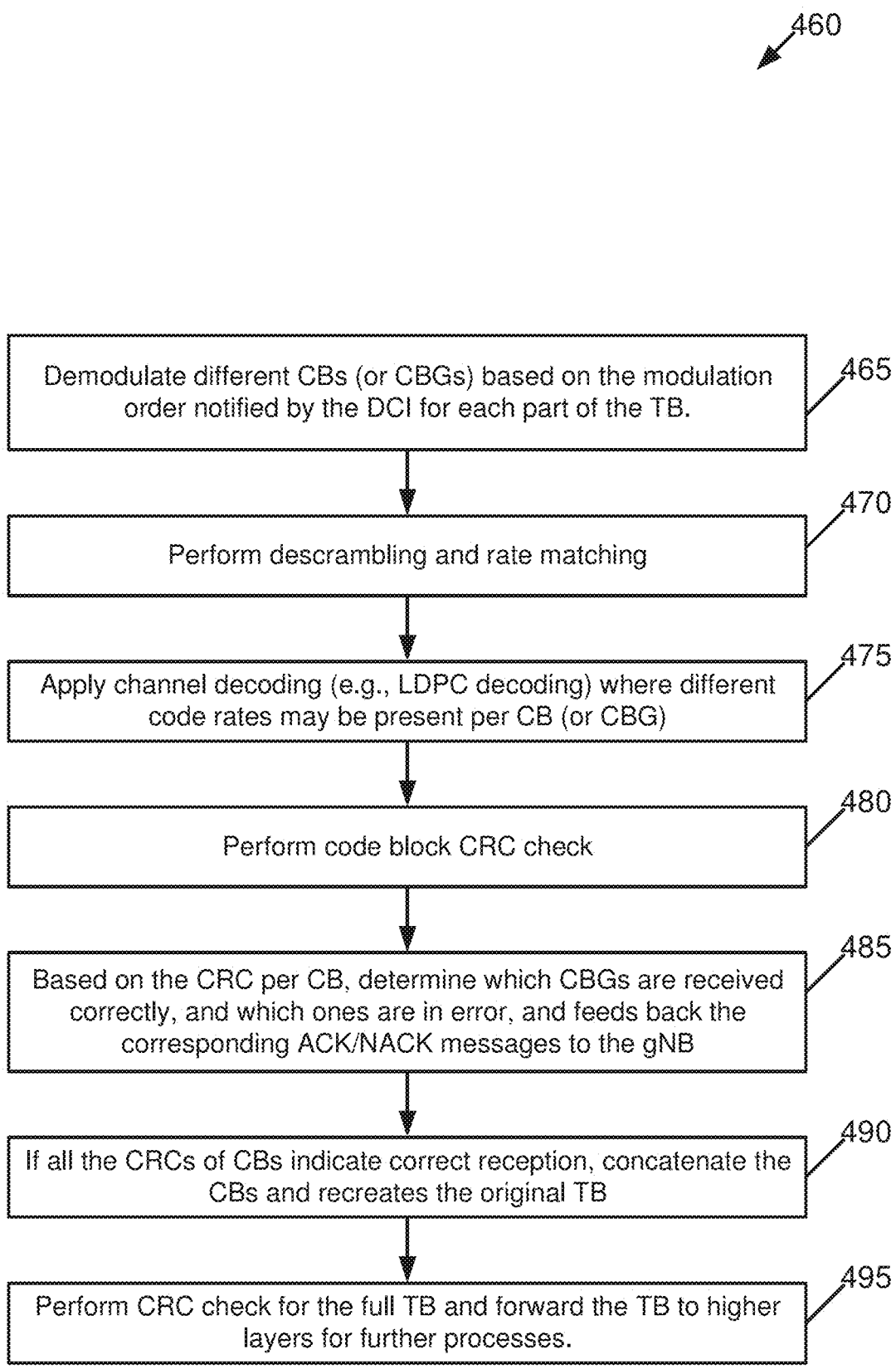
FIG. 4A is a logic flow diagram providing an example of actions taken by a UE for an exemplary procedure of the proposed technique in downlink, in accordance with an exemplary embodiment.

Detailed possible reception steps at the UE side are illustrated by FIG. 4A, which is a logic flow diagram providing an example of actions taken by a UE for an exemplary procedure of the proposed technique, in accordance with an exemplary embodiment. FIG. 4A also illustrates the operation of an exemplary method, a result of execution of computer program instructions embodied on a computer readable memory, functions performed by logic implemented in hardware, and/or interconnected means for performing functions in accordance with an exemplary embodiment. This figure is assumed to be performed by the UE 110, under control of the control module 140.

In block 465, the UE 110 performs demodulation of different CBs (or CBGs) based on the modulation order notified by the DCI for each part of the TB. In one embodiment, if the modulation order is fixed for the full TB, demodulation may be performed once for all the CBs (and CBGs) using the single modulation order.

In block 470, the UE 110 performs descrambling and rate matching. The UE, in block 475, applies channel decoding (e.g., LDPC decoding), where different code rates may be present per CB (or CBG). Effective code rate information is indicated in the corresponding received DCI.

In block 480, the UE 110 performs a code block CRC check, i.e., of each of the CBs (and CBGs). The UE, based on the CRC per CB, determines in block 485 which CBGs are received correctly, and which ones are in error, and feeds back the corresponding ACK/NACK messages to the gNB.

In block 490, if all the CRCs of CBs indicate correct reception, the UE concatenates the CBs and recreates the original TB. The UE then performs a CRC check for the full TB and forwards the TB to higher layers for further processes.

Figure 5:
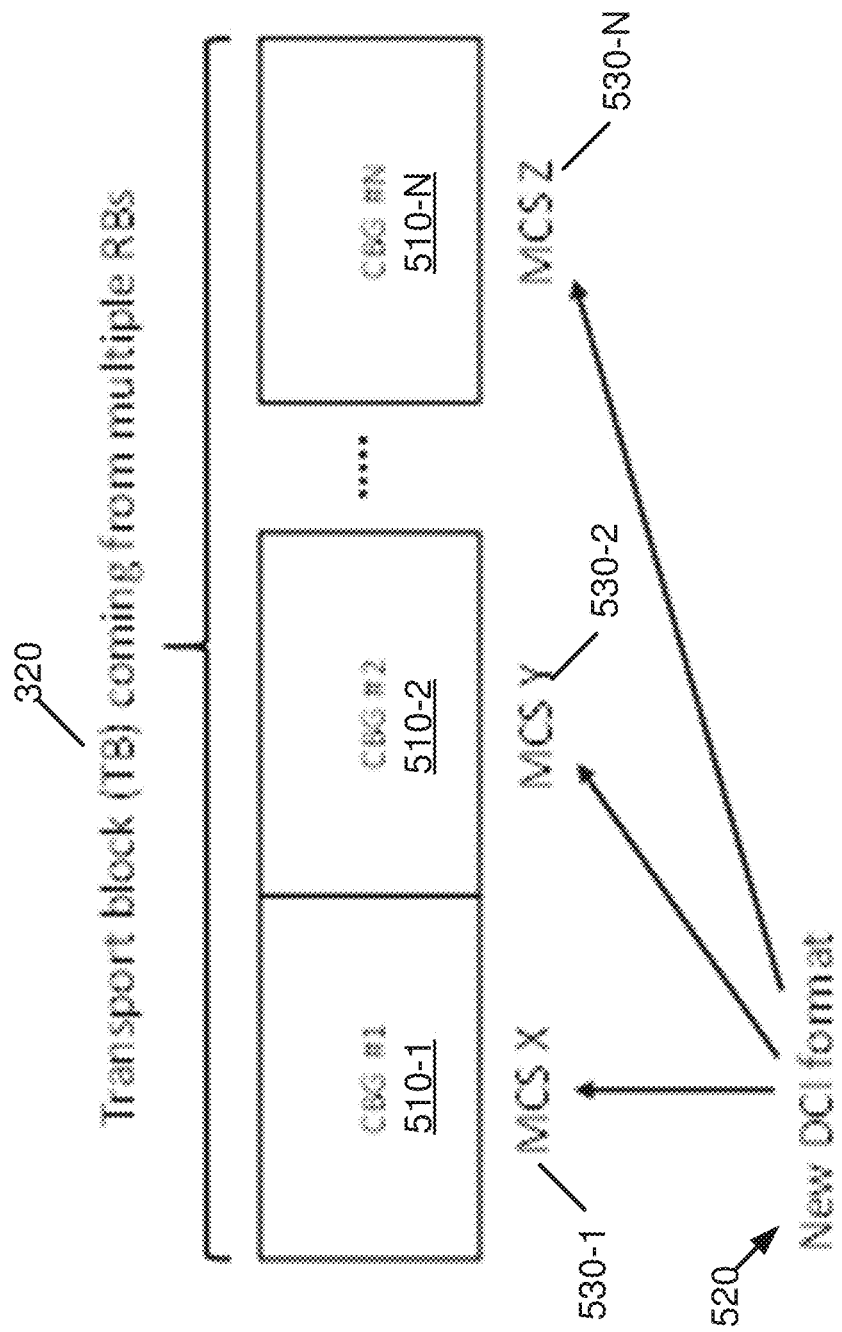
FIG. 5 is a diagram summarizing an example of the new proposed PDSCH/PUSCH transmissions, in accordance with an exemplary embodiment.

An example of how the transmission format of the PDSCH transmission is illustrated in FIG. 5. Similar principles can be used to illustrate the transmission format of the PUSCH. As shown for this particular example, the PDSCH transmission may include N different CBGs 510-1, 510-2, . . . , 510-N, where the MCS 510-1, 530-2, . . . , 530-N for each of those can be set independently by introducing a new DCI format 520. The new DCI format may be implemented as an extension of DCI Format 1_0 and Format 11 (see details in 3GPP TS 38.212 and 38.214) by including separate Information Element (fields) that express the MCS index per CBG, using 5 bits to indicate each MCS index. For UL, new UCI formats may be implemented as an extension of Format 0_0 and 0_1 to include additional MCS indication information. Other embodiments include the following options:

1) Include a 5-bit word to indicate the base MCS, and include N-bits to indicate the delta MCS as compared to the base MCS of each CBG. Value of N<5 bits. Note that the example here with a 5-bit word to indicate base MCS is just an example, using other word sizes is not excluded.
2) Include a 5-bit word to indicate the base MCS, and include M-bits to indicate the delta effective coding rate as compared to the base MCS of each CBG. Value of M<5 bits. Hence assume same modulation scheme for each CBG, and only allow different coding schemes.

Same as 1) and 2), but instead of indicating the MCS per CBG (or CB), the MCS could be indicated per group of CBGs, by including a vector in the new DCI format that informs the UE which CBGs are with the same MCS.

The new proposed DCI format could be anchored in 3GPP TS 38.212 and 38.214 as a new format 1_X, as an example. For the UL case, new UCI format could be anchored as a new 0_X format.

Figure 6:
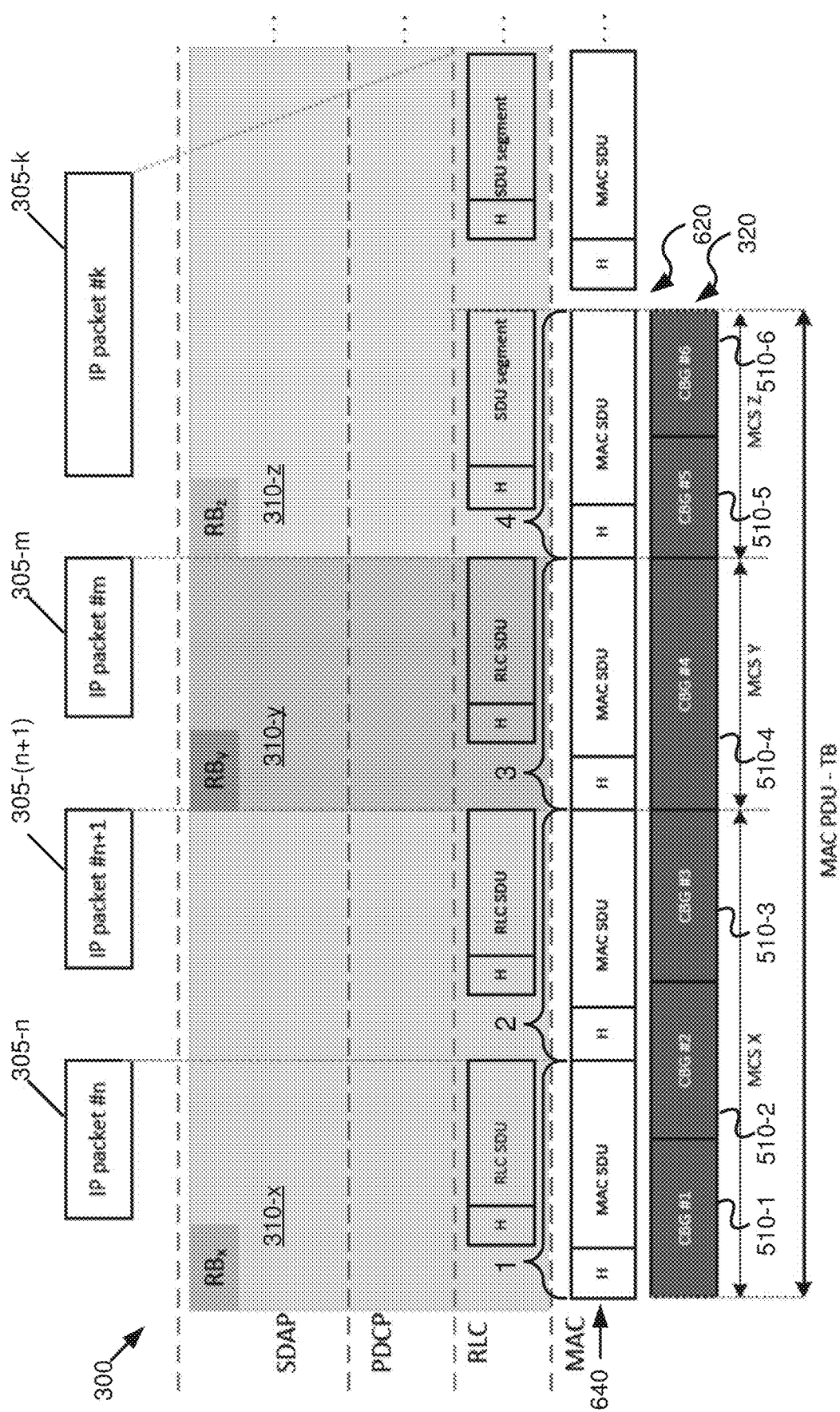
FIG. 6 is an example showing how CBGs are mapped based on the examples of FIGS. 3 and 5, in accordance with an exemplary embodiment.

Referring to FIG. 6, an example is shown of how CBGs are mapped based on the examples of FIGS. 3 and 5, in accordance with an exemplary embodiment. The protocol stack 300 of FIG. 3 is illustrated again, but with a TB 320 of CBGs 510. Assume that IP packets 305-$n$, 305-($n$+1), 305-$m$, and 305-$k$ are being transmitted. There are three RBs 310: RB$_x$ 310-$x$; RB$_y$ 310-$y$; and RB$_z$ 310-$z$. The IP packets 305 travel through the SDAP, PDCP, RLC, and MAC layers, ending at a MAC TB 620. The MAC TB 620 has four PDUs 640-1, 640-2, 640-3 and 640-4. As illustrated in block 420 of FIG. 4, one idea is that each of the CBGs (or CBs) should only contain data from one radio bearer. This is the case in FIG. 6, as CBG #1 510-1, CBG #2 510-2 and CBG #3 510-3 contain data from RB 310-$x$; CBG #4 510-4 contains data from RB 310-$y$; and CBG #5 510-5 and CBG #6 510-6 contain data from RB 310-$z$. Note that MAC PDUs 640-1 and 640-2 are contained in CBG #1 510-1, CBG #2 510-2, and CBG #3 510-3; MAC PDU 640-3 is contained in CBG #4 510-4; MAC PDU 640-4 is contained in CBG #5 510-5 and CBG #6 510-6.

Reception is the opposite of transmission: the PAC PDU-TB 320 is received, and the IP packets 305 are output from the stack (assuming there are no errors or the errors are corrected). In terms of UL or DL, a gNB 170 starts at IP packets 305 and ends at the TB 320 in DL, and starts at TB 320 and ends at IP packets 305 in UL. The UE 110 is opposite: the UE starts at TB 320 and ends at IP packets 305 in DL, and starts at IP packets 305 and ends at the TB 320 in UL.

Figure 7:
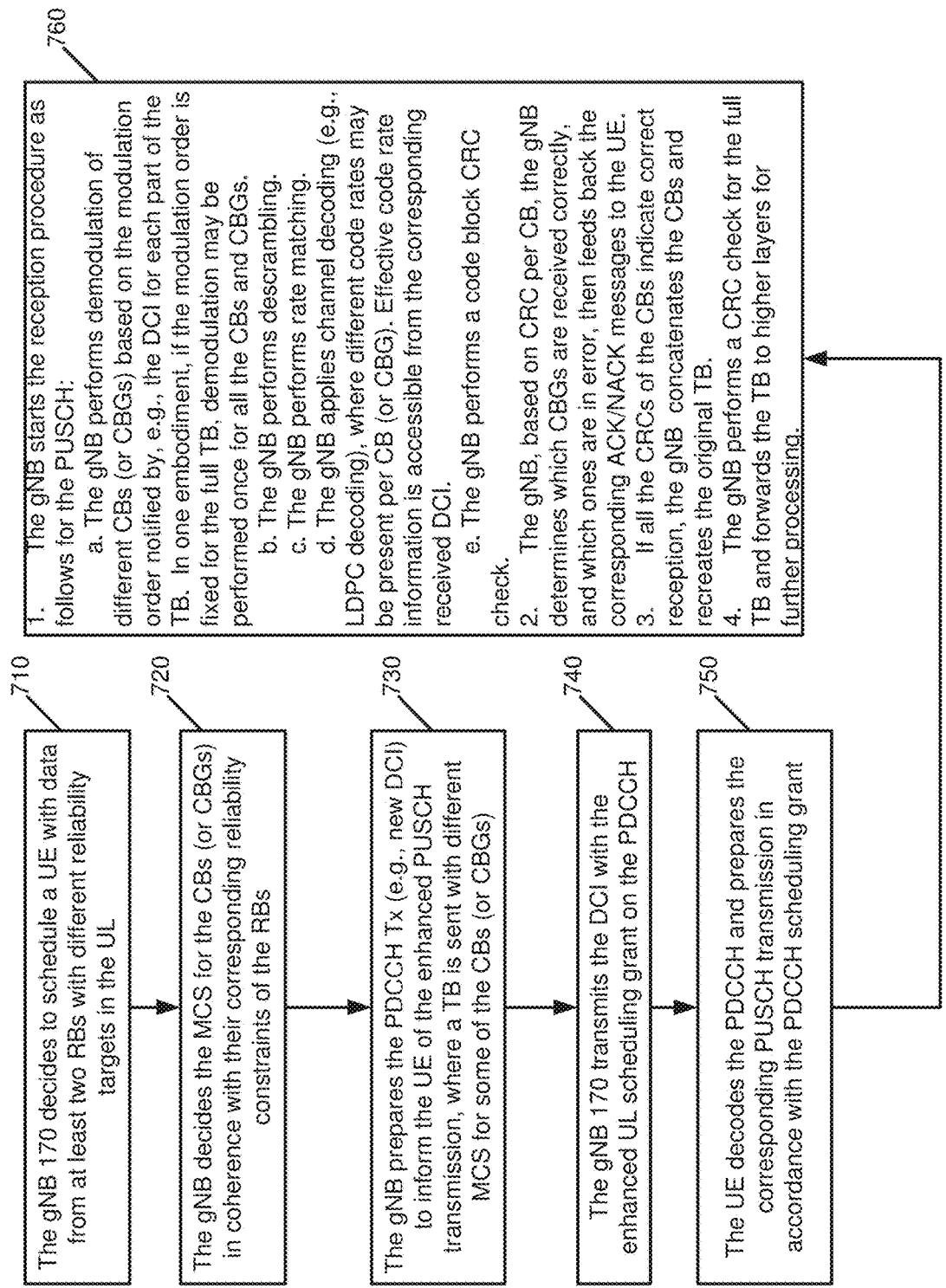
FIG. 7 is a logic flow diagram providing a summary of an overall exemplary procedure of the proposed technique in uplink.

That is, very similar procedures may be performed in UL, where the UE may want to provide diverse reliability guarantees for data from each RB. Here, the steps for the UL case are briefly mentioned, and it is noted that the transmission on PUSCH are relatively identical to the DL case. FIG. 7 summarizes the various procedural steps of the idea in the UL direction. FIG. 7 is a logic flow diagram providing a summary of an overall exemplary procedure of the proposed technique in uplink, and illustrates the operation of an exemplary method, a result of execution of computer program instructions embodied on a computer readable memory, functions performed by logic implemented in hardware, and/or interconnected means for performing functions in accordance with an exemplary embodiment. This figure includes actions by both the UE 110 and the gNB 170. The UE 110 is under control of the control module 140, and the gNB 170 is under control of the control module 150, in order to perform the operations in FIG. 7.

In block 710, the gNB 170 decides to schedule a UE with data from at least two RBs with different reliability targets in the UL. The gNB in block 720 decides the MCS for the CBs (or CBGs) in coherence with their corresponding reliability constraints of the RBs. The gNB prepares the PDCCH Tx (e.g., new DCI) to inform the UE of the enhanced PUSCH transmission, where a TB is sent with different MCS for some of the CBs (or CBGs). See block 730. In block 740, the gNB 170 transmits the DCI with the enhanced UL scheduling grant on the PDCCH. In block 750, the UE decodes the PDCCH and prepares the corresponding PUSCH transmission in accordance with the PDCCH scheduling grant. This is described in reference to FIG. 7A.

In block 760, the gNB performs actions on reception of the TB received in accordance with the enhanced UL scheduling grant. See the following:
1. The gNB starts the reception procedure as follows for the PUSCH:
   a. The gNB performs demodulation of different CBs (or CBGs) based on the modulation order notified by, e.g., the DCI for each part of the TB. In one embodiment, if the modulation order is fixed for the full TB, demodulation may be performed once for all the CBs and CBGs.
   b. The gNB performs descrambling.
   c. The gNB performs rate matching.
   d. The gNB applies channel decoding (e.g., LDPC decoding), where different code rates may be present per CB (or CBG). Effective code rate information is accessible from the corresponding received DCI.
   e. The gNB performs a code block CRC check.
2. The gNB, based on CRC per CB, the gNB determines which CBGs are received correctly, and which ones are in error, then feeds back the corresponding ACK/NACK messages to the UE.
3. If all the CRCs of the CBs indicate correct reception, the gNB concatenates the CBs and recreates the original TB.
4. The gNB performs a CRC check for the full TB and forwards the TB to higher layers for further processing.

Figure 7A:
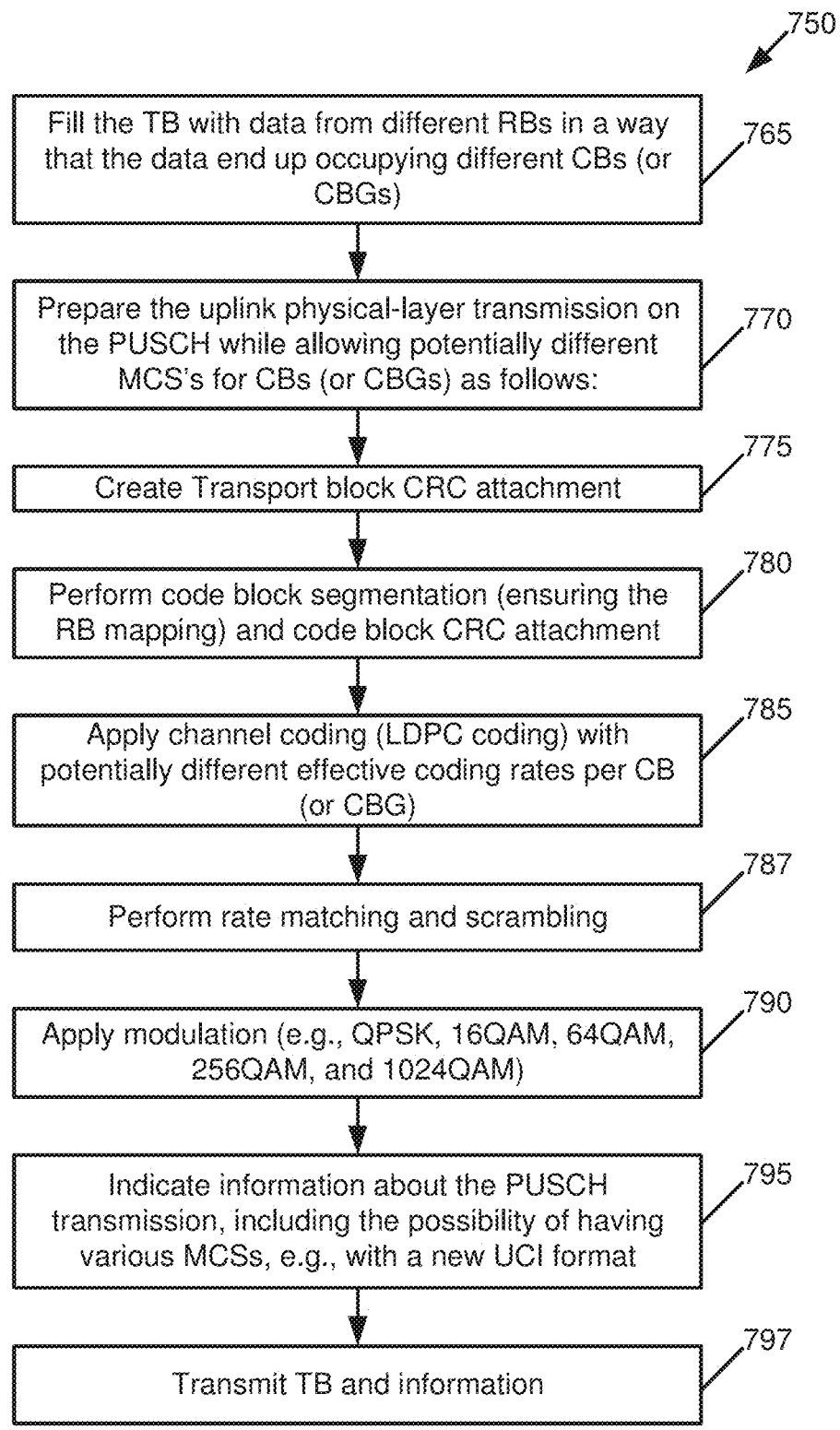
FIG. 7A is a logic flow diagram providing an example of actions taken by a UE for an exemplary procedure of a proposed technique in uplink, in accordance with an exemplary embodiment.

Turning to FIG. 7A, this figure is a logic flow diagram providing an example of actions taken by a UE for an exemplary procedure of a proposed technique in uplink, in accordance with an exemplary embodiment. FIG. 7A also illustrates the operation of an exemplary method, a result of execution of computer program instructions embodied on a computer readable memory, functions performed by logic implemented in hardware, and/or interconnected means for performing functions in accordance with an exemplary embodiment. This figure is assumed to be performed by the UE 110, under control of the control module 140.

The process starts at the UE (in order to prepare for transmitting data from multiple RBs) filling the TB with data from different RBs in a way that they end up occupying different CBs (or CBGs). See block 765. The same example of the case for two RBs mentioned above is also valid here. Next, the UE prepares (block 770) the uplink physical-layer transmission on the PUSCH while allowing potentially different MCS's for CBs (or CBGs) as follows:

The UE creates the transport block CRC attachment, block 775.

The UE performs code block segmentation (ensuring the RB mapping) and code block CRC attachment. See block 780.

The UE applies channel coding (e.g., LDPC coding) with potentially different effective coding rates per CB (or CBG). See block 785.

The UE performs rate matching and scrambling in block 787.

The UE applies modulation (e.g., QPSK, 16QAM, 64QAM, 256QAM, and 1024QAM) in block 790. In one embodiment, the same modulation is used for the full TB, while in a second embodiment, different modulation schemes are used per (e.g., every or at least two) CB (or CBG).

Correspondingly, information about the PUSCH transmission including the possibility of having various MCSs is indicated by the UE, e.g., with a new UCI format. See block 795. In block 797, the UE transmits the TB and information in the PUSCH. The TB is transmitted on the PUSCH. Meanwhile, UCI can in principle be transmitted on both PUSCH and PUCCH, depending on what information is in the UCI. UCI may be used for Configured Grant and only sent on PUSCH, in an example. If the UCI is used, the information in the UCI could be similar to what has been described herein for DCI.

Without in any way limiting the scope, interpretation, or application of the claims appearing below, a technical effect and advantage of the proposed solutions is they enable (e.g., optimized) downlink and uplink transmissions of TBs with data from different RBs that have diverse reliability requirements., e.g., enabling to send a TB with URLLC data in CBs (of CBG) with a very conservative MCS as well as eMBB with in other CBs (or CBGs) with a more aggressive MCS to have higher spectral efficiency. Similarly, the solutions allow (e.g., optimized) TB transmission that, e.g., contain video/audio data with different reliability targets as is relevant for XR use cases. This is a clear advantage as compared to today's functionality, where the gNB has to select the MCS for the TB according to the data in the TB with the strictest reliability constraints.

Another alternative solution would of course be to allow multiple DL scheduling grants for a UE in TTI, such that the gNB could separately schedule data from different RBs in different TBs (each with their own MCS). However, this would require sending multiple DCI formats 1_0 or 11, which would account to larger signaling overhead as compared to the proposed solution here, and also higher overhead (and possibly higher energy consumption) for the UE to monitor for larger number of simultaneous DCI formats. The proposed solution is therefore much more attractive. Same challenge is valid for the UL case, where transmission of multiple TBs is much harder due to UE's power consumption constraints and single TB transmission is more preferable.

The following are additional examples.

Example 1. A Method, Comprising:
for a network node in wireless communication with a user equipment, filling a transport block such that at least two data with different reliability requirements are mapped to separate code blocks;
applying by the network node different modulation and coding schemes to at least the separate code blocks comprising the data with different reliability requirements within the transport block; and
transmitting, from the network node toward the user equipment, the transport block after the different modulation and coding schemes have been applied.

Example 2. The method according to example 1, wherein the different modulation and coding schemes comprise one or both of different modulation or different coding.

Example 3. The method according to any one of examples 1 to 2, wherein the filling is performed so that individual code blocks have data from only one radio bearer.

Example 4. The method according to any one of examples 1 to 3, further comprising:
transmitting, by the network node toward the user equipment and prior to transmitting the transport block, control information informing the user equipment of an upcoming transmission of a transport block where different modulation and coding schemes are applied to at least two different code blocks within the transport block.

Example 5. The method according to example 4, wherein the control information comprises downlink control information including bits indicating corresponding modulation and coding schemes applied to the at least two different code blocks.

Example 6. The method according to any one of examples 1 to 5, wherein:
the at least two data with different reliability requirements are data with substantially different reliability requirements; and
the method further comprises applying by the network node a same modulation and coding scheme to code blocks comprising data with a same or substantially similar reliability requirements within the transport block.

Example 7. The method according to any one of examples 1 to 6, wherein multiple ones of the code blocks are formed into code block groups, and any operations performed on code blocks are performed for the code block groups.

Example 8. A method, comprising:
receiving, by a user equipment in wireless communication with a network node, a transport block from the network node, where different modulation and coding schemes have been applied to at least two different code blocks within the transport block, wherein data in code blocks to which different modulation and coding schemes have been applied have different reliability requirements; and
decoding and performing, by the user equipment, error checking of the code blocks based on the corresponding modulation and coding schemes that were applied.

Example 9. The method according to example 8, wherein the different modulation and coding schemes comprise one or both of different modulation or different coding.

Example 10. The method according to any one of examples 8 to 9, wherein the filling is performed so that individual code blocks have data from only one radio bearer.

Example 11. The method according to any one of examples 8 to 10, wherein:
the method further comprises receiving, by the user equipment from the network node and prior to the receiving the transport block, control information informing the user equipment of an upcoming transmission of a transport block where different modulation and coding schemes are applied to at least two different code blocks; and
the decoding and performing error checking are performed using the control information.

Example 12. The method according to example 11, wherein the control information comprises downlink control information including bits indicating corresponding modulation and coding schemes applied to the at least two different code blocks.

Example 13. The method according to any one of examples 8 to 12, wherein:
the at least two data with different reliability requirements are data with substantially different reliability requirements; and
the method further comprises applying by the network node a same modulation and coding scheme to code blocks comprising data with a same or substantially similar reliability requirements within the transport block.

Example 14. The method according to any one of examples 8 to 13, wherein multiple ones of the code blocks are formed into code block groups, and any operations performed on code blocks are performed for the code block groups.

Example 15. The method according to any one of examples 8 to 14, wherein data in code blocks to which different modulation and coding schemes have been applied have substantially different reliability requirements and wherein data in code blocks to which a same modulation and coding schemes have been applied have a same or substantially similar reliability requirements.

Example 16. The method according to any one of examples 8 to 15, wherein the decoding and performing error checking further comprises:
demodulating the at least two different code blocks in the transport block and
applying channel decoding to the demodulated at least two different code blocks based on information received in a single downlink control information describing the modulation and coding applied to the at least two different code blocks before transmission.

Example 17. The method according to example 16, further comprising:
determining which of the at least two different code blocks were received correctly and which were received in error, and feeding back corresponding acknowledgment indication for any block received correctly or feeding back negative acknowledgement indication for any block received incorrectly.

Example 18. A method, comprising:
for a user equipment in wireless communication with a user network node, filling a transport block such that at least two data with different reliability requirements are mapped to separate code blocks;
applying by the user equipment different modulation and coding schemes to at least the separate code blocks comprising the data with different reliability requirements within the transport block; and transmitting, from the user equipment toward the network node, the transport block after the different modulation and coding schemes have been applied.

Example 19. The method according to example 18, wherein the different modulation and coding schemes comprise one or both of different modulation or different coding.

Example 20. The method according to any one of examples 18 to 19, wherein the filling is performed so that individual code blocks have data from only one radio bearer.

Example 21. The method according to any one of examples 18 to 20, further comprising:

transmitting, by the user equipment toward the network node and prior to transmitting the transport block, control information informing the network node of an upcoming transmission of a transport block where different modulation and coding schemes are applied to at least two different code blocks within the transport block.

Example 22. The method according to example 21, wherein the control information comprises uplink control information including bits indicating corresponding modulation and coding schemes applied to the at least two different code blocks.

Example 23. The method according to any one of examples 18 to 22, wherein multiple ones of the code blocks are formed into code block groups, and any operations performed on code blocks are performed for the code block groups.

Example 24. The method according to any of examples 18 to 23, wherein:

the at least two data with different reliability requirements are data with substantially different reliability requirements; and the method further comprises applying by the network node a same modulation and coding scheme to code blocks comprising data with a same or substantially similar reliability requirements within the transport block.

Example 25. A computer program, comprising code for performing the methods of any of examples 1 to 24, when the computer program is run on a computer.

Example 26. The computer program according to example 25, wherein the computer program is a computer program product comprising a computer-readable medium bearing computer program code embodied therein for use with the computer.

Example 27. The computer program according to example 25, wherein the computer program is directly loadable into an internal memory of the computer.

Example 28. An apparatus comprising means for performing:

for a network node in wireless communication with a user equipment, filling a transport block such that at least two data with different reliability requirements are mapped to separate code blocks;

applying by the network node different modulation and coding schemes to at least y the separate code blocks comprising the data with different reliability requirements within the transport block; and transmitting, from the network node toward the user equipment, the transport block after the different modulation and coding schemes have been applied.

Example 29. The apparatus according to example 28, comprising means for performing the method in any one of examples 2 to 7.

Example 30. An apparatus comprising means for performing:

receiving, by a user equipment in wireless communication with a network node, a transport block from the network node, where different modulation and coding schemes have been applied to at least two different code blocks within the transport block, wherein data in code blocks to which different modulation and coding schemes have been applied have different reliability requirements; and decoding and performing, by the user equipment, error checking of the code blocks based on the corresponding modulation and coding schemes that were applied.

Example 31. The apparatus according to example 30, comprising means for performing the method in any one of examples 9 to 17.

Example 32. An apparatus comprising means for performing:

for a user equipment in wireless communication with a user network node, filling a transport block such that at least two data with different reliability requirements are mapped to separate code blocks;

applying by the user equipment different modulation and coding schemes to at least the separate code blocks comprising the data with different reliability requirements within the transport block; and transmitting, from the user equipment toward the network node, the transport block after the different modulation and coding schemes have been applied.

Example 33. The apparatus according to example 32, comprising means for performing the method in any one of examples 19 to 23.

Example 34. The apparatus of any of examples 28 to 33, wherein the means comprises:

at least one processor; and at least one memory including computer program code, the at least one memory and computer program code configured to, with the at least one processor, cause the performance of the apparatus.

Example 35. An apparatus, comprising:

one or more processors; and one or more memories including computer program code, wherein the one or more memories and the computer program code are configured, with the one or more processors, to cause the apparatus to:

for a network node in wireless communication with a user equipment, fill a transport block such that at least two data with different reliability requirements are mapped to separate code blocks;

apply by the network node different modulation and coding schemes to at least y the separate code blocks comprising the data with different reliability requirements within the transport block; and transmit, from the network node toward the user equipment, the transport block after the different modulation and coding schemes have been applied.

Example 36. The apparatus according to example 35, wherein the different modulation and coding schemes comprise one or both of different modulation or different coding.

Example 37. The apparatus according to any one of examples 35 to 36, wherein the filling is performed so that individual code blocks have data from only one radio bearer.

Example 38. The apparatus according to any one of examples 35 to 37, further comprising:

transmitting, by the network node toward the user equipment and prior to transmitting the transport block, control information informing the user equipment of an upcoming transmission of a transport block where different modulation and coding schemes are applied to at least two different code blocks.

Example 39. The apparatus according to example 38, wherein the control information comprises downlink control information including bits indicating corresponding modulation and coding schemes applied to the at least two different code blocks.

Example 40. The apparatus according to any one of examples 35 to 39, wherein:
the at least two data with different reliability requirements are data with substantially different reliability requirements; and
the one or more memories and the computer program code are further configured, with the one or more processors, to cause the apparatus to apply by the network node a same modulation and coding scheme to code blocks comprising data with a same or substantially similar reliability requirements within the transport block.

Example 41. The apparatus according to any one of examples 35 to 40, wherein multiple ones of the code blocks are formed into code block groups, and any operations performed on code blocks are performed for the code block groups.

Example 42. An apparatus, comprising:
one or more processors; and
one or more memories including computer program code,
wherein the one or more memories and the computer program code are configured, with the one or more processors, to cause the apparatus to:
receive, by a user equipment in wireless communication with a network node, a transport block from the network node, where different modulation and coding schemes have been applied to at least two different code blocks within the transport block, wherein data in code blocks to which different modulation and coding schemes have been applied have different reliability requirements; and
decode and perform, by the user equipment, error checking of the code blocks based on the corresponding modulation and coding schemes that were applied.

Example 43. The apparatus according to example 42, wherein the different modulation and coding schemes comprise one or both of different modulation or different coding.

Example 44. The apparatus according to any one of examples 42 to 43, wherein the filling is performed so that individual code blocks have data from only one radio bearer.

Example 45. The apparatus according to any one of examples 42 to 44, wherein:
the one or more memories and the computer program code are further configured, with the one or more processors, to cause the apparatus to receive by the user equipment from the network node and prior to the receiving the transport block, control information informing the user equipment of an upcoming transmission of a transport block where different modulation and coding schemes are applied to at least two different code blocks; and
the decoding and performing error checking are performed using the control information.

Example 46. The apparatus according to example 45, wherein the control information comprises downlink control information including bits indicating corresponding modulation and coding schemes applied to the at least two different code blocks.

Example 47. The apparatus according to any one of examples 42 to 46, wherein:
the at least two data with different reliability requirements are data with substantially different reliability requirements; and
the one or more memories and the computer program code are further configured, with the one or more processors, to cause the apparatus to apply by the network node a same modulation and coding scheme to code blocks comprising data with a same or substantially similar reliability requirements within the transport block.

Example 48. The apparatus according to any one of examples 42 to 47, wherein multiple ones of the code blocks are formed into code block groups, and any operations performed on code blocks are performed for the code block groups.

Example 49. The apparatus according to any one of examples 42 to 48, wherein data in code blocks to which different modulation and coding schemes have been applied have substantially different reliability requirements and wherein data in code blocks to which a same modulation and coding schemes have been applied have a same or substantially similar reliability requirements.

Example 50. The apparatus according to any one of examples 42 to 49, wherein the decoding and performing error checking further comprises:
demodulating the at least two different code blocks in the transport block and
applying channel decoding to the demodulated at least two different code blocks based on information received in a single downlink control information describing the modulation and coding applied to the at least two different code blocks before transmission.

Example 51. The apparatus according to example 50, further comprising:
determining which of the at least two different code blocks were received correctly and which were received in error, and feeding back corresponding acknowledgment indication for any block received correctly or feeding back negative acknowledgement indication for any block received incorrectly.

Example 52. An apparatus, comprising:
one or more processors; and
one or more memories including computer program code,
wherein the one or more memories and the computer program code are configured, with the one or more processors, to cause the apparatus to:
for a user equipment in wireless communication with a user network node, filling a transport block such that at least two data with different reliability requirements are mapped to separate code blocks;
applying by the user equipment different modulation and coding schemes to at least the separate code blocks comprising the data with different reliability requirements within the transport block; and
transmitting, from the user equipment toward the network node, the transport block after the different modulation and coding schemes have been applied.

Example 53. The apparatus according to example 52, wherein the different modulation and coding schemes comprise one or both of different modulation or different coding.

Example 54. The apparatus according to any one of examples 52 to 53, wherein the filling is performed so that individual code blocks have data from only one radio bearer.

Example 55. The apparatus according to any one of examples 52 to 54, further comprising:
  transmitting, by the user equipment toward the network node and prior to transmitting the transport block, control information informing the network node of an upcoming transmission of a transport block where different modulation and coding schemes are applied to at least two different code blocks.

Example 56. The apparatus according to example 55, wherein the control information comprises uplink control information including bits indicating corresponding modulation and coding schemes applied to the at least two different code blocks.

Example 57. The apparatus according to any one of examples 52 to 56, wherein multiple ones of the code blocks are formed into code block groups, and any operations performed on code blocks are performed for the code block groups.

Example 58. The apparatus according to any of examples 52 to 57, wherein:
  the at least two data with different reliability requirements are data with substantially different reliability requirements; and
  the one or more memories and the computer program code are further configured, with the one or more processors, to cause the apparatus to apply by the network node a same modulation and coding scheme to code blocks comprising data with a same or substantially similar reliability requirements within the transport block.

As used in this application, the term "circuitry" may refer to one or more or all of the following:
  (a) hardware-only circuit implementations (such as implementations in only analog and/or digital circuitry) and
  (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and
  (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:
  3GPP third generation partnership project
  5G fifth generation
  5GC 5G core network
  5QI 5G QoS Identifier
  ACK Acknowledgement
  AMF access and mobility management function
  ARQ Automatic repeat request
  BLER Block error rate
  BLEP Block error probability
  CB Code block
  CBG Code block group
  CQI channel quality indicator
  CRC Cyclic Redundancy Check
  CU central unit
  DCI Downlink Control Indicator
  DL Downlink
  DU distributed unit
  eMBB enhanced mobile broadband
  eNB (or eNodeB) evolved Node B (e.g., an LTE base station)
  EN-DC E-UTRA-NR dual connectivity
  en-gNB or En-gNB node providing NR user plane and control plane protocol terminations towards the UE, and acting as secondary node in EN-DC
  E-UTRA evolved universal terrestrial radio access, i.e., the LTE radio access technology
  gNB (or gNodeB) base station for 5G/NR, i.e., a node providing NR user plane and control plane protocol terminations towards the UE, and connected via the NG interface to the 5GC
  HARQ Hybrid ARQ
  IE Information Element
  I/F interface
  IP Internet protocol
  LA Link adaptation
  LDPC low-density parity-check
  LTE long term evolution MAC medium access control
MCS modulation and coding scheme
MME mobility management entity
mux multiplex or multiplexer
NACK Negative ACK
ng or NG next generation
ng-eNB or NG-eNB next generation eNB
NR new radio
N/W or NW network
OFDM Orthogonal frequency domain multiplexing
PDB packet delay budget
PDCCH physical downlink control channel
PDCP packet data convergence protocol
PDSCH Physical downlink shared channel
PDB Packet Delay Budget
PDU protocol data unit
PHY physical layer
RAN radio access network
RB Radio Bearer
Rel release
RLC radio link control
RRH remote radio head
RRC radio resource control
RU radio unit
Rx receiver
SDAP service data adaptation protocol
SGW serving gateway
SMF session management function
TB Transport block
TBS TB size
TS technical specification
TSN time-sensitive networking
Tx transmitter
UCI uplink control information
UE user equipment (e.g., a wireless, typically mobile device)
UL uplink
UPF user plane function
URLLC Ultra reliable low latency communication
QoS Quality of service
XR eXtended Reality

What is claimed is:

1. An apparatus, comprising:
one or more processors; and
one or more memories storing instructions that, when executed by the one or more processors, cause the apparatus to perform at least the following:
for a network node in wireless communication with a user equipment, filling a transport block with at least two data with different reliability requirements based on different packet delay budgets or different remaining delay budgets, and mapping the at least two data to separate code blocks;
applying, by the network node, different modulation and coding schemes to at least the separate code blocks comprising the data with different reliability requirements based on the different packet delay budgets of the different rem packet delay budgets, where data with lower remaining packet delay budget or packet delay budget are set to a lower modulation and coding scheme than are data that are farther away from their corresponding remaining packet delay budget or packet delay budget; and
transmitting, from the network node toward the user equipment, the transport block at least by transmitting the separate coding blocks after the different modulation and coding schemes have been applied.

2. The apparatus according to claim 1, wherein the different modulation and coding schemes comprise one or both of different modulation or different coding.

3. The apparatus according to claim 1, wherein the filling and mapping are performed where individual code blocks have data from only one radio bearer.

4. The apparatus according to claim 1, wherein the one or more memories store instructions that, when executed by the one or more processors, cause the apparatus to perform at least the following:
transmitting, by the network node toward the user equipment and prior to transmitting the transport block, control information informing the user equipment of an upcoming transmission of a transport block where different modulation and coding schemes are applied to at least two different code blocks corresponding to the transport block.

5. The apparatus according to claim 1, wherein:
the at least two data with different reliability requirements are data with substantially different reliability requirements; and
the one or more memories store instructions that, when executed by the one or more processors, cause the apparatus to perform applying by the network node a same modulation and coding scheme to code blocks comprising data with a same or substantially similar reliability requirements within the transport block.

6. The apparatus according to claim 1, wherein multiple ones of the code blocks are formed into code block groups, and any operations performed on code blocks are performed for the code block groups.

7. An apparatus, comprising:
one or more processors; and
one or more memories storing instructions that, when executed by the one or more processors, cause the apparatus to perform at least the following:
receiving, by a user equipment in wireless communication with a network node, at least two different code blocks corresponding to a transport block from the network node, where different modulation and coding schemes have been applied to the at least two different code blocks corresponding to the transport block, wherein data in and mapped to the at least two different code blocks to which different modulation and coding schemes have been applied have different reliability requirements based on different packet delay budgets or different remaining delay budgets, where data with lower remaining packet delay budget or packet delay budget have been set to a lower modulation and coding scheme than were data that were farther away from their corresponding remaining packet delay budget or packet delay budget;
decoding and performing, by the user equipment, error checking of the at least two different code blocks based on the corresponding modulation and coding schemes that were applied; and
recreating the transport block using the at least two different code blocks after the error checking has been performed.

8. The apparatus according to claim 7, wherein the different modulation and coding schemes comprise one or both of different modulation or different coding.

9. The apparatus according to claim 7, wherein individual ones of the at least two different code blocks have data from only one radio bearer.

10. The apparatus according to claim 7, wherein:
the one or more memories store instructions that, when executed by the one or more processors, cause the apparatus to perform receiving by the user equipment from the network node and prior to the receiving the at least two different code blocks corresponding to the transport block, control information informing the user equipment of an upcoming transmission of a transport block where different modulation and coding schemes are applied to at least two different code blocks corresponding to the transport block; and
the decoding and performing error checking are performed using the control information.

11. The apparatus according to claim 7, wherein:
at least two data have been mapped into the at least two different code blocks, have different reliability requirements, and are data with substantially different reliability requirements; and
the one or more memories store instructions that, when executed by the one or more processors, cause the apparatus to perform applying by the network node a same modulation and coding scheme to code blocks comprising data with a same or substantially similar reliability requirements within the transport block.

12. The apparatus according to claim 7, wherein multiple ones of the code blocks are formed into code block groups, and any operations performed on code blocks are performed for the code block groups.

13. The apparatus according to claim 7, wherein data in code blocks to which different modulation and coding schemes have been applied have substantially different reliability requirements and wherein data in code blocks to which a same modulation and coding schemes have been applied have a same or substantially similar reliability requirements.

14. The apparatus according to claim 7, wherein the decoding and performing error checking further comprises:
demodulating the at least two different code blocks corresponding to the transport block; and
applying channel decoding to the demodulated at least two different code blocks based on information received in a single downlink control information describing the modulation and coding applied to the at least two different code blocks before transmission.

15. An apparatus, comprising:
one or more processors; and
one or more memories storing instructions that, when executed by the one or more processors, cause the apparatus to perform at least the following:
for a user equipment in wireless communication with a network node, filling a transport block with at least two data with different reliability requirements based on different packet delay budgets or different remaining delay budgets and mapping the at least two data to separate code blocks;
applying, by the user equipment, different modulation and coding schemes to at least the separate code blocks comprising the data with different reliability requirements based on the different packet delay budgets or different remaining packet delay budgets, where data with lower remaining packet delay budget or packet delay budget are set to a lower modulation and coding scheme than are data that are further away from their corresponding remaining packet delay budget or packet delay budget; and
transmitting, from the user equipment toward the network node, the transport block at least by transmitting the separate coding blocks after the different modulation and coding schemes have been applied.

16. The apparatus according to claim 15, wherein the different modulation and coding schemes comprise one or both of different modulation or different coding.

17. The apparatus according to claim 15, wherein the filling and mapping are performed where individual code blocks have data from only one radio bearer.

18. The apparatus according to claim 15, wherein the one or more memories store instructions that, when executed by the one or more processors, cause the apparatus to perform at least the following:
transmitting, by the user equipment toward the network node and prior to transmitting the transport block, control information informing the network node of an upcoming transmission of a transport block where different modulation and coding schemes are applied to at least two different code blocks corresponding to the transport block, wherein the control information comprises uplink control information including bits indicating corresponding modulation and coding schemes applied to the at least two different code blocks.

19. The apparatus according to claim 15, wherein multiple ones of the code blocks are formed into code block groups, and any operations performed on code blocks are performed for the code block groups.

20. The apparatus according to claim 15, wherein:
the at least two data with different reliability requirements are data with substantially different reliability requirements; and
the one or more memories store instructions that, when executed by the one or more processors, cause the apparatus to perform applying by the network node a same modulation and coding scheme to code blocks comprising data with a same or substantially similar reliability requirements within the transport block.

* * * * *